Patented Apr. 24, 1951

2,550,253

UNITED STATES PATENT OFFICE 2,550,253

PRESERVATION OF FOOD PRODUCTS

Lloyd B. Jensen, Chicago, and Walter R. Hess, Downers Grove, Ill., assignors, by mesne assignments, to Swift & Company, a corporation of Illinois No Drawing. Application December 11, 1946, Serial No. 715,606. In Canada October 4, 1945

13 Claims. (Cl. 99—150)

The present invention relates to the curing of meats and more particularly to such a curing in which the development of bacteria therein is prevented or greatly retarded.

Within recent years there has been developed a curing process for meats and particularly hams known as a quick-cure which requires only a fraction of the time which was normally required by the old processes. Essentially the quick-cure process consists in pumping the pickling solution under pressure into the vascular system of the meat. By this means a ham can be cured in a period of time ranging from fifteen to eighteen days, rather than the 60 to 90 days required by the old processes in which the meats were usually immersed in a bath of the pickling fluid.

There has arisen, however, as the result of extensive commercial use of the quick-curing method an attendant serious health problem. The hams and other meats cured by the older immersion processes were extremely resistant to the development of pathogenic bacteria, of which various representatives of the Staphylococci may be mentioned as typical, and the general public has come to rely on this property in its eating and storage habits. Hams processed by quick-curing, on the other hand, have resulted in a meat product which is not nearly so resistant to these organisms, and numerous cases of food poisoning have resulted from the general public's unfamiliarity with this fact.

It is acordingly an object of this invention to provide a meat curing process in which the resulting product is stabilized against deterioration by the development of bacteria therein.

Another object of the present invention is to provide pickle for meat products which will greatly retard the development of pathogenic bacteria.

A still further object of the present invention is to provide a method of quick-curing meat products such as ham which will yield a product of excellent appearance and taste, but in which the development of harmful bacteria is prevented or greatly retarded.

A still further object of the present invention is to provide a pickling solution suitable for use in a process for quick-curing meats which will greatly retard the development of harmful living organisms in the meat.

It has been found as the result of this invention that the addition of extremely small amounts of antibiotic materials to the conventional pickling solution will result in a meat product cured therewith which has a very marked increase in resistance to the development of pathogenic organisms.

Antibiotic materials which we have found to be useful are extracts of certain plant tissues. When such tissues are extracted with a suitable solvent, such as acetone, hexane, trichlorethylene, ethyl alcohol, methyl ethyl ketone, ethylacetate, etc., they yield antibiotic substances which have varying degrees of antibacterial potency against gas forming bacilli of the genus Bacillus, such as *Bacillus subtilis*; molds of the genera Aspergillus and Penicillium, such as *Aspergillus glaucus*, and *Penicillium notatum*; the bacilli of the genus Clostridium, such as *Clostridium sporogenes*; the staphylococci, such as *Staphylococcus aureus*; *Achromobacter perolens*; *Escherichia coli*; *Penicillium camemberti*; and *Pseudomonas fluorescens* and *Pseudomonas syncyanea*. The plants which yield the antibiotic substances include numerous varieties which will not be listed in detail. In the following table are given typical examples of plant extracts together with a range of possible dilutions between the "low" and the "high," as well as the "preferred."

| Plant Source | Extract Dilutions | | |
|---|---|---|---|
| | Low | Preferred | High |
| Avocado | 1:500 | 1:2000 | 1:40000 |
| Grindelia | 1:200 | 1:2000 | 1:5000 |
| Krameria | 1:500 | 1:2000 | 1:5000 |
| Pareira | 1:100 | 1:500 | 1:800 |
| Sanguinaria (blood root) | 1:100 | 1:500 | 1:1000 |
| Juniper berries | 1:100 | 1:500 | 1:1000 |
| Fragrant sumac | 1:100 | 1:500 | 1:1000 |
| Cypress wood | 1:100 | 1:500 | 1:5000 |
| Iris bulbs | 1:100 | 1:500 | 1:1000 |
| Sassafras root | 1:100 | 1:300 | 1:500 |
| Grape vines | 1:100 | 1:500 | 1:2000 |
| Kamala | 1:50 | 1:100 | 1:1000 |
| Bittersweet root | 1:500 | 1:2000 | 1:40000 |
| Boletus (fungus) | 1:100 | 1:500 | 1:1000 |
| Yerba Santa | 1:100 | 1:500 | 1:2000 |
| Dry sage | 1:100 | 1:500 | 1:1000 |
| Saw Palmetto | 1:100 | 1:500 | 1:1000 |
| Canadian Thistle | 1:50 | 1:100 | 1:500 |
| Osage orange wood | 1:100 | 1:500 | 1:1000 |
| White cedar wood | 1:50 | 1:100 | 1:500 |
| Dogwood | 1:50 | 1:100 | 1:500 |

The dilutions in the above table are based on an arbitrary unit which represents the extract from 5 grams of the plant material extracted. Thus, if the unit is 1 milliliter of extract such unit contains the equivalent of the material extracted from 5 grams of the plant material. A dilution of 1:500 for example is the equivalent of the material extracted from 5 grams of the plant material diluted 500 times.

The preparation of the antibiotic material will not be described in detail since such preparation is not a part of the present invention. In general, the plant antibiotic materials are extracted from various parts of the plant, for example, the pits of avocado, the stems of grapevine, or the root of bittersweet, by soaking the comminuted materials in a solvent, such as acetone. The solvent is distilled off under vacuum and the residue taken up in ethyl alcohol so that each milliliter of solution contains the extract equivalent to 5 grams of plant tissue. The antibiotic material may be incorporated in the curing reagent as an alcoholic solution, in the dry form or in any other convenient manner.

A curing pickle stock containing an antibiotic substance from plant extract may be prepared from the following formula:

100 gallons 90° salometer salt solution
7 pounds sodium nitrate
10 ounces sodium nitrite
20 pounds sugar
75.7 cc. antibiotic solution (1 ml.=5 g. plant tissue)

In the quick-curing of hams, shoulders, corned beef, etc., it is customary to pump the curing solution into the blood vessels as shown in U. S. Patent No. 2,084,864. The pumped product may then be immersed for the required time in a bath of the curing pickle.

A fresh pork shoulder was quick-cured with a pickle containing the antibiotic material extracted from avocado pits in the dilution of 1:2000. The cured shoulder was incubated at 99° F. At the end of two weeks the growth of staphylococci was found to be inhibited whereas a shoulder cured in a similar manner with pickle containing no added antibiotic showed appreciable growth of staphylococci.

We have also found that samples of corned beef quick-cured with pickle containing antibiotic materials from plant sources, such as grapevine and bittersweet, to be substantially free from toxic bacteria heretofore mentioned whereas samples quick-cured with ordinary pickle were found to contain strains of such bacteria.

Reference is made to copending application Serial No. 659,881, filed April 5, 1946, "Antibiotic Material"; Serial No. 701,406, filed October 15, 1946, "Antibiotic Material"; Serial No. 708,450, filed November 7, 1946, "Antibiotic Substances"; Serial No. 59,409, filed November 10, 1948, "Antibiotic Material"; Serial No. 64,909, filed December 11, 1948, "Antibiotic Material"; Serial No. 67,240, filed December 24, 1948, "Antibiotic Material"; Serial No. 92,494, filed May 10, 1949, "Antibiotic Material"; Serial No. 100,291, filed June 20, 1949, "Antibiotic Material"; and Serial No. 196,519, filed November 18, 1950, "Antibiotic Material."

Obviously, many modifications and variations of the invention, as hereinbefore set forth, may be made without departing from the spirit and scope thereof, and therefore only such limitations should be imposed as are indicated in the appended claims.

We claim:

1. A curing pickle for quick-curing meats consisting essentially of curing salts, and a small amount of a non-toxic antibiotic material of a higher plant extract, said antibiotic material being extracted from the plant tissues by a non-aqueous organic solvent, and said antibiotic material being present in sufficient amount in the curing pickle to inhibit bacterial growth in the cured product.

2. In the process of quick-curing meats including injecting a pickling solution into said meat, the step of adding to the pickling solution a small amount of a preservative consisting essentially of a non-toxic antibiotic material of a higher plant derived therefrom by treatment with a non-aqueous organic solvent whereby said antibiotic material is retained in the meat in sufficient amount to inhibit bacterial growth.

3. A meat pickle as defined in claim 1 wherein the antibiotic material is an extract of iris bulbs.

4. A meat pickle as defined in claim 1 wherein the antibiotic material is an extract of dry sage.

5. A meat pickle as defined in claim 1 wherein the antibiotic material is an extract of Canadian thistle.

6. A process as defined in claim 2 wherein the antibiotic material is an extract of iris bulbs.

7. A process as defined in claim 2 wherein the antibiotic material is an extract of dry sage.

8. A process as defined in claim 2 wherein the antibiotic material is an extract of Canadian thistle.

9. A process as defined in claim 2 wherein the antibiotic material is an extract of *Rhus crenata*.

10. A process as defined in claim 2 wherein the antibiotic material is an extract of *Sanguinaria canadensis*.

11. A meat pickle as defined in claim 1 wherein the antibiotic material is an extract of *Rhus crenata*.

12. A meat pickle as defined in claim 1 wherein the antibiotic material is an extract of *Sanguinaria canadensis*.

13. In the process of treating food products subject to deterioration by food spoiling and food poisoning bacteria, the step of adding to the food product a small amount of an antibiotic consisting essentially of a non-toxic antibiotic material of a higher plant derived therefrom by treatment with a non-aqueous organic solvent whereby said antibiotic material is retained in the food product in sufficient amount to inhibit bacterial growth.

LLOYD B. JENSEN.
WALTER R. HESS.

REFERENCES CITED

The following references are of record in the file of this patent:

UNITED STATES PATENTS

| Number | Name | Date |
| --- | --- | --- |
| 877,703 | Budde | Jan. 28, 1908 |
| 2,084,864 | Paddock | June 22, 1937 |
| 2,117,478 | Hall | May 17, 1938 |
| 2,173,992 | Allen | Sept. 26, 1939 |

OTHER REFERENCES

"Nature," May 13, 1944, vol. 153, page 598, article entitled "Antibacterial Substances in Green Plants."